(12) United States Patent
Kinai et al.

(10) Patent No.: US 11,563,727 B2
(45) Date of Patent: Jan. 24, 2023

(54) MULTI-FACTOR AUTHENTICATION FOR NON-INTERNET APPLICATIONS

(71) Applicant: International Business Machines Corporation, Armonk, NY (US)

(72) Inventors: Andrew Kinai, Nairobi (KE); Fred Ochieng Otieno, Nairobi (KE); Nelson Kibichii Bore, Lessos (KE); Komminist Weldemariam, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 17/020,753

(22) Filed: Sep. 14, 2020

(65) Prior Publication Data

US 2022/0086131 A1 Mar. 17, 2022

(51) Int. Cl.

| | |
|---|---|
| H04L 29/06 | (2006.01) |
| H04W 4/14 | (2009.01) |
| G06F 16/23 | (2019.01) |
| G06F 40/253 | (2020.01) |
| G06F 40/279 | (2020.01) |
| G06N 20/00 | (2019.01) |
| H04L 9/40 | (2022.01) |

(52) U.S. Cl.
CPC .......... *H04L 63/08* (2013.01); *G06F 16/2379* (2019.01); *G06F 40/253* (2020.01); *G06F 40/279* (2020.01); *G06N 20/00* (2019.01); *H04L 63/1425* (2013.01); *H04L 63/1433* (2013.01); *H04W 4/14* (2013.01)

(58) Field of Classification Search
CPC . H04L 63/08; H04L 63/1425; H04L 63/1433; G06F 16/2379; G06F 40/253; G06F 40/279; G06N 20/00; H04W 4/14
See application file for complete search history.

(56) References Cited

U.S. PATENT DOCUMENTS

| | | |
|---|---|---|
| 10,104,057 B2 | 10/2018 | Gupta |
| 10,158,479 B2 | 12/2018 | Chapman et al. |

(Continued)

FOREIGN PATENT DOCUMENTS

| | | |
|---|---|---|
| EP | 3008935 A1 | 4/2016 |
| WO | WO2012004640 A1 | 1/2012 |
| WO | WO2012167941 A1 | 12/2012 |

OTHER PUBLICATIONS

Van Niekerk, SMS could be in line for a make over with blockchain technology, iTouch, downloaded Feb. 4, 2020 from https://itouch.co.za/news/sms-chain.php, 5 pages.

(Continued)

*Primary Examiner* — Muhammad Raza
(74) *Attorney, Agent, or Firm* — Shimon Benjamin; Otterstedt & Kammer PLLC

(57) ABSTRACT

Receive a transaction generated by a user of a non-internet application; identify transaction life cycle steps of previous similar transactions; and generate a transaction risk score for the transaction using machine learning models and a blockchain record of the previous similar transactions. In response to the transaction risk score exceeding a threshold value, authenticate the transaction and the user using two-step authentication. The two-step authentication uses challenge/answer templates derived from the blockchain record of previous transactions.

8 Claims, 9 Drawing Sheets

(56) References Cited

U.S. PATENT DOCUMENTS

| | | | |
|---|---|---|---|
| 10,237,732 B2 | 3/2019 | Ciamiello et al. | |
| 2010/0153451 A1* | 6/2010 | Delia | G06F 21/316 |
| | | | 707/E17.014 |
| 2020/0193443 A1* | 6/2020 | Piel | G06Q 20/40145 |
| 2020/0213128 A1* | 7/2020 | Sharma | H04L 9/0643 |
| 2020/0402062 A1* | 12/2020 | Shi | G06Q 20/40 |

OTHER PUBLICATIONS

MCoin Initial Coin Offering: The World's First Cryptocurrency Accessible Even Without the Internet, ONEm Communications Ltd., Published Date: May 2, 2018.

Amrutiya et. al., Trustless Two-Factor Authentication Using Smart Contracts in Blockchains, 2019 International Conference on Information Networking (ICOIN), Published Date: Jan. 11, 2019, pp. 66-71.

Aziz et al., Machine Learning and AI for Risk Management, Disrupting Finance, Dec. 7, 2018, pp. 33-50.

SearchNetworking.com, Unstructured Supplementary Service Data, Apr. 2020, pp. 1-3.

* cited by examiner

```
{
    "events": [
        {
            "doc0": {
                "user": "SalesRepresentative",
                "organization": "Distributor",
                "eventType": "OrderConfirmation",
                "docHash": "5E8FF9BF55B" // Contains the hashed order amount of the
                        confirmed order
            }
        },
        {
            "doc1": {
                "user": "Shopkeeper",
                "organization": "SME",
                "eventType": "AugmentedAuthentication",
                "docHash": "B015CFEC81A" // Contains the hashed challenge correctly
                        answered derived from the previous action
            }
        },
        {
            "doc2": {
                "user": "Shopkeeper",
                "organization": "SME",
                "eventType": "RequestForLoan",
                "docHash": "44RER68j5E8" // Contains the hashed loan amount of the
                        confirmed order
            }
        }
    ]
}
```

FIG. 6

[{'Pay', 'NN'}, {'1020', 'CD'}, {'in', 'IN'}, {'8', 'CD'}, {'days', 'NNS'}]

[{'Pay', 'NN'}, {'1010', 'CD'}, {'in', 'IN'}, {'4', 'CD'}, {'days', 'NNS'}]

MULTI-FACTOR AUTHENTICATION FOR NON-INTERNET APPLICATIONS

BACKGROUND

The present invention relates to the electrical, electronic, and computer arts, and more specifically, to securing electronic communications.

Non-internet applications (e.g., short message service (SMS) or unstructured supplementary service data (USSD) formats) are popular for certain services, particularly in the financial service industry. Such "offline" applications offer low bandwidth, high interactivity, and simple access. As of 2018, offline applications solely for mobile money services reached about 866 million subscribers, while only 39% of users in low resourced regions had internet-enabled smartphones. In order to reach more users with financial services, SMS/USSD based applications are preferred because they can run on any appropriately configured mobile device (e.g., cellular phone or CDMA/GSM modem).

SUMMARY

Principles of the invention provide techniques for multi-factor authentication for non-internet applications. In one aspect, an exemplary method includes receiving a transaction generated by a user of a non-internet application; identifying transaction life cycle steps of previous similar transactions; generating a transaction risk score for the transaction using machine learning models and a blockchain record of the previous similar transactions; and in response to the transaction risk score exceeding a threshold value, authenticating the transaction and the user using two-step authentication. The two-step authentication uses challenge/answer templates derived from the blockchain record of previous transactions.

One or more embodiments of the invention or elements thereof can be implemented in the form of a computer program product including a computer readable storage medium with computer usable program code for facilitating the method steps indicated. Furthermore, one or more embodiments of the invention or elements thereof can be implemented in the form of a system (or apparatus) including a memory that embodies computer executable instructions, and at least one processor that is coupled to the memory and operative by the instructions to facilitate exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a tangible computer readable storage medium (or multiple such media) and implemented on a hardware processor, or (iii) a combination of (i) and (ii); any of (i)-(iii) implement the specific techniques set forth herein.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

In view of the foregoing, techniques of the present invention can provide substantial beneficial technical effects. For example, one or more embodiments provide one or more of:

An easy way to authenticate the identity of a user initiating an electronic communication.

A multi-factor authentication based on blockchain-controlled workflow that maps non-internet-based application operations (offline operations) to concrete blockchain steps.

Detecting malicious offline operations using machine learning models and blockchain system.

Determining multi-factor authentication based on deep analysis of the transaction context, and by using predefined rules.

Automatically generating and modifying smart contracts of an offline workflow for multi-factor authentication.

Authenticating a user and transaction by executing a multi-factor authentication workflow.

These and other features and advantages of the present invention will become apparent from the following detailed description of illustrative embodiments thereof, which is to be read in connection with the accompanying drawings.

BRIEF DESCRIPTION OF THE DRAWINGS

FIG. 6 depicts an exemplary data structure for the system shown in FIG. 3;

FIG. 7 depicts part of speech tagging performed by the system shown in FIG. 3, according to an exemplary embodiment;

DETAILED DESCRIPTION

Figure 1:
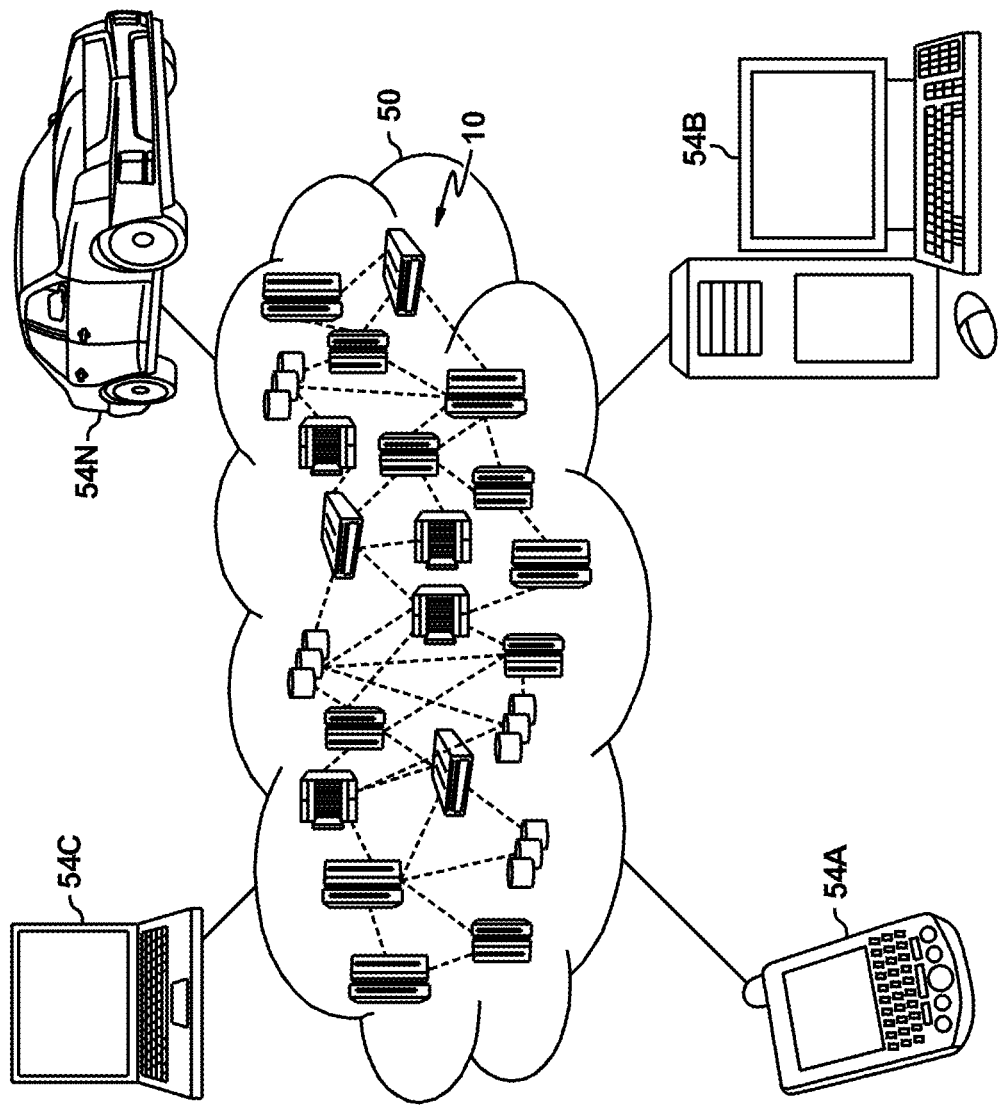
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
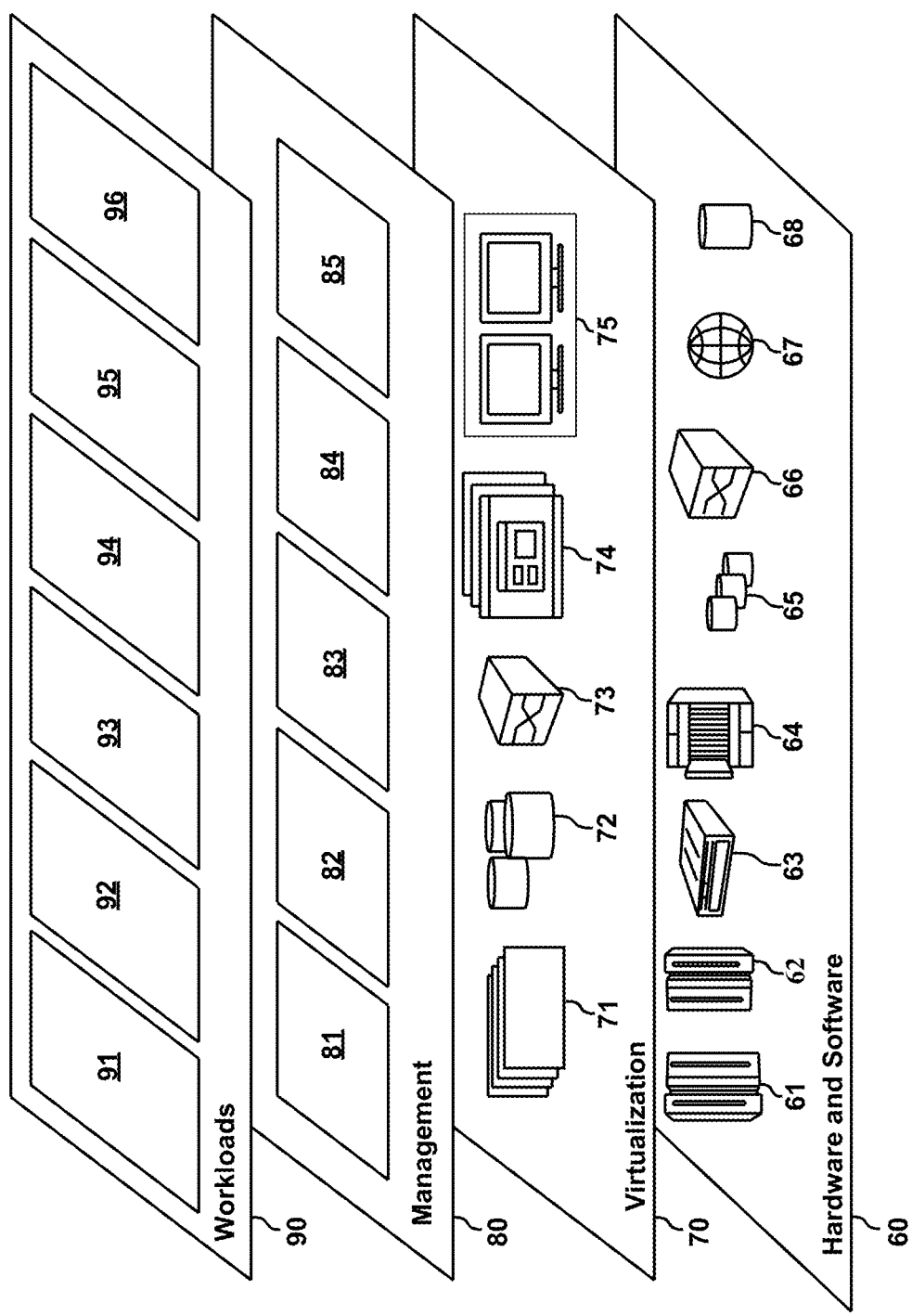
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a system 96 for multi-factor authentication for non-internet applications.

SMS/USSD workflow (offline) applications are vulnerable to attacks aimed at gaining unauthorized access to critical data for several reasons. First, SMS and USSD protocols transfer data in clear text in an open telephone network, rendering the protocols susceptible to man-in-the-middle attacks. Due to the nature of their mode of interaction (text-based), this limits the type of multi-factor authentication methods (e.g. fingerprint, CAPTCHA) that can be applied. Due to the text-based interaction mode, it may require a user to enter PINs multiple times, which may lead to user fatigue caused by too much data entry. By exploiting these sequences, attackers may follow a multi-stage threat workflow to break into an SMS or USSD based application with the goal of harvesting critical data.

For internet applications, multi-factor authentication can be used to try to thwart unauthorized access. Multi-factor authentication is an authentication method in which a computer user is granted access to data only after successfully presenting two or more pieces of evidence (or factors) to an authentication mechanism: knowledge (something the user and only the user knows), possession (something the user and only the user has), and inherence (something the user and only the user is). An example of multi-factor authentication is two factor authentication, in which a user presents knowledge of credentials for an account via a first device and then receives a confirmation code via a second device (e.g., a smartphone) that is registered to the account and in the user's possession. One assumption of two factor authentication is that only the appropriate user possesses the second device. When a user possesses only a single device (e.g., a non-internet phone), two factor authentication at best is simplified to knowledge of the credentials for the account and possession of the single device that may be registered to the account. Because the credentials that can be submitted via a non-internet phone typically are limited to an account number and a personal identification number (PIN), and because without separate internet access there is no secure way to register a non-internet phone to an account, offline applications are less secure. Furthermore, malicious acts to gain unauthorized access to critical data via offline applications have steadily increased.

Consequently, it is desirable to implement authentication for non-internet based applications such as SMS (Short Message Service) and USSD (Unstructured Supplementary Service Data). Accordingly, aspects of the invention implement multi-step authentication of a user's credentials or executed user activities in an offline transaction.

Figure 3:
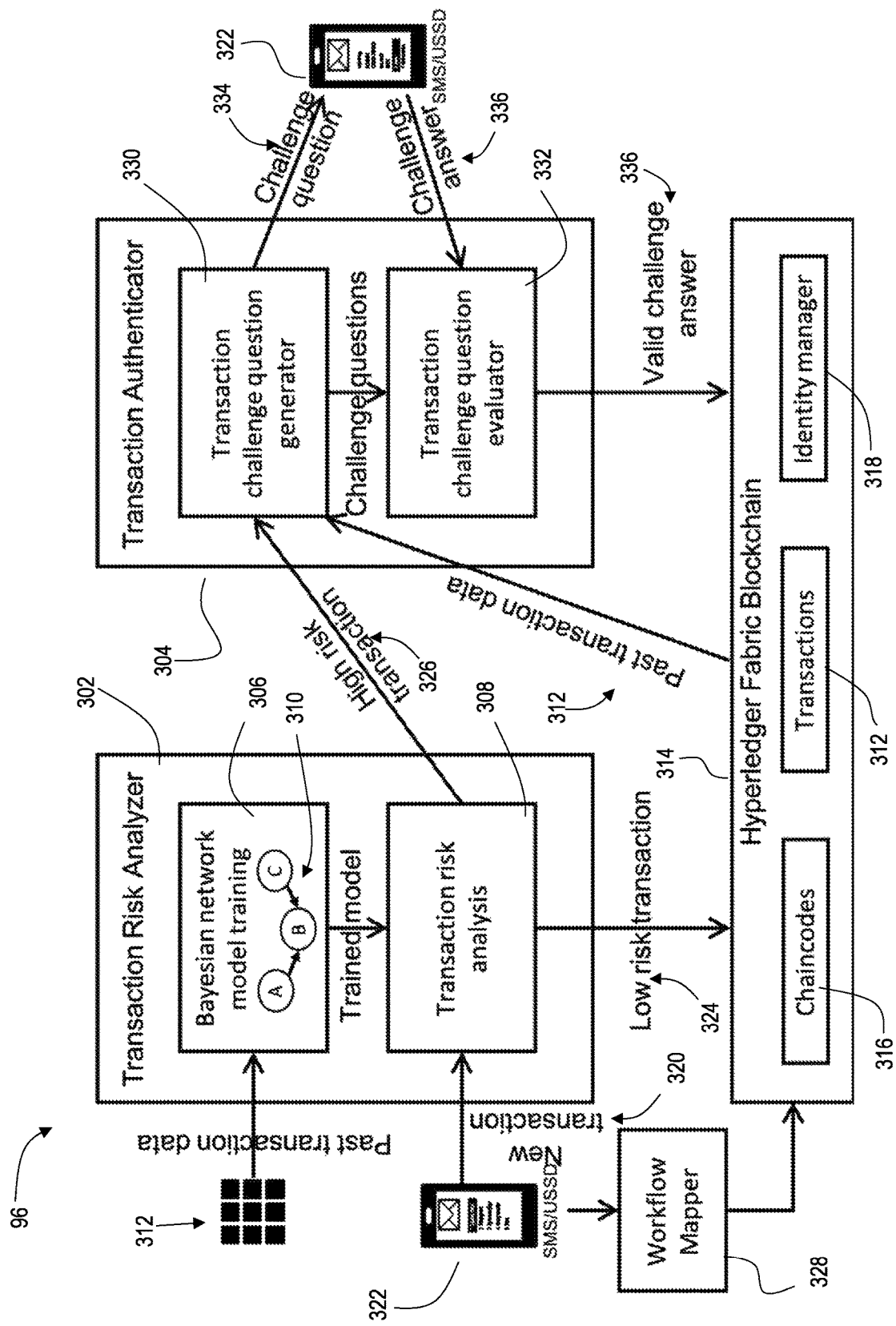
FIG. 3 depicts core components of a system for multi-factor authentication for non-internet applications, according to an exemplary embodiment.

FIG. 3 depicts core components of the system 96, which implements two-step authentication using blockchain-controlled workflows that map offline (SMS/USSD protocol) transactions into concrete blockchain steps, then retrieves portions of the workflow for challenge/authentication questioning. The system 96 includes a transaction risk analyzer 302 and a transaction authenticator 304. Leveraging these components, the system 96 detects malicious offline operations using machine learning models and a blockchain system; determines multi-factor authentication based on deep analysis of the transaction context; by using predefined rules, automatically generates and modifies smart contracts of the workflows; and authenticates a user and transaction by executing the multi-factor authentication workflow.

Two-step verification or two-step authentication is a type of multi-factor authentication that confirms a user's credentials by utilizing a second factor other than something they have or something they are, i.e. a second fact presumed to be known only by that user. An example of a second step is the user repeating back a fact (other than the user's credentials) that was sent to the user through an out-of-band mechanism or at a previous time. Blockchain strategies can enable authentication in an SMS/USSD workflow application for offline (band-limited) users, while reducing tedious repetition of user authentication interactions. For example, blockchain can record a user's past transactions which then can be mined for two-step verification questions.

The transaction risk analyzer 302 incorporates a Bayesian network model training module 306 and a transaction risk analyzer 308 that makes use of a Bayesian network model 310 trained by the training module 306. The training module 306 trains the Bayesian network model 310 using past transaction data (workflows) 312, which the training module 306 retrieves from a Hyperledger fabric blockchain 314 (Hyperledger is an open source community focused on developing a suite of stable frameworks, tools and libraries for enterprise-grade blockchain deployments). The blockchain 314 is maintained at a backend of the system 96 as further discussed below. The blockchain 314 also includes chaincodes 316 and an identity manager 318. Chaincodes 316 are programs (written by way of non-limiting examples in Go, node.js, or Java) that implement a prescribed interface. The chaincodes are further used to execute and control authentication logic formally encoded as workflows in a secure and trusted blockchain network. Identity manager 318 is a microservice wrapper for managing blockchain related membership services within a given business network. This ensures that all users are registered and provided with the appropriate permission protocols within the network. It also provides authentication of users and ensures they are authorized to perform transactions they initiate.

The transaction risk analyzer 308 receives transactions 320 from a mobile device 322, via SMS or USSD protocol. The transactions 320 can be effectuated by recording them in the blockchain 314. The transaction risk analyzer 308 classifies each of the transactions 320 as a "low risk" transaction 324 or as a "high risk" transaction 326, in response to operation of the Bayesian network model 310. For example, in one or more embodiments the Bayesian network model 310 proposes a "low risk" classification when aspects of the transaction 320 resemble corresponding aspects of a previous successful transaction, or proposes a "high risk" classification when aspects of the transaction 320 resemble corresponding aspects of a previous unsuccessful transaction. Further details of the transaction risk analyzer 308, as implemented in one or more embodiments, are explained with reference to FIG. 8. The transaction risk analyzer 308 sends high risk transactions 326 to the transaction authenticator 304. In parallel to the transaction risk analyzer 308 categorizing low risk transactions 324 or high risk transaction 326, a workflow mapper 328 effectuates the transactions 320 by recording each transaction into the blockchain 314. Certain details of the workflow mapper 328, as implemented in one or more embodiments, are explained with reference to FIG. 4.

The transaction authenticator 304 incorporates a transaction challenge question generator 330 and a transaction challenge question evaluator 332. Certain details of the transaction authenticator 304, as implemented in one or more embodiments, are explained with reference to FIG. 9. The transaction challenge question generator 330 sends a challenge question 334 to the mobile device 322. The challenge question 334 is based on the past transaction data 312, i.e. it provides a portion of a workflow 312 and seeks a matching portion. The transaction challenge question evaluator 332 receives a challenge answer 336 from the mobile device 322. In response to the challenge answer 336 being a valid answer (i.e. the matching portion of the past transaction data 312), then the transaction challenge question evaluator 332 records the high risk transaction 326 into the blockchain 314. Otherwise the transaction challenge question evaluator 332 does not record the high risk transaction 326 (the transaction does not take effect).

Figure 4:
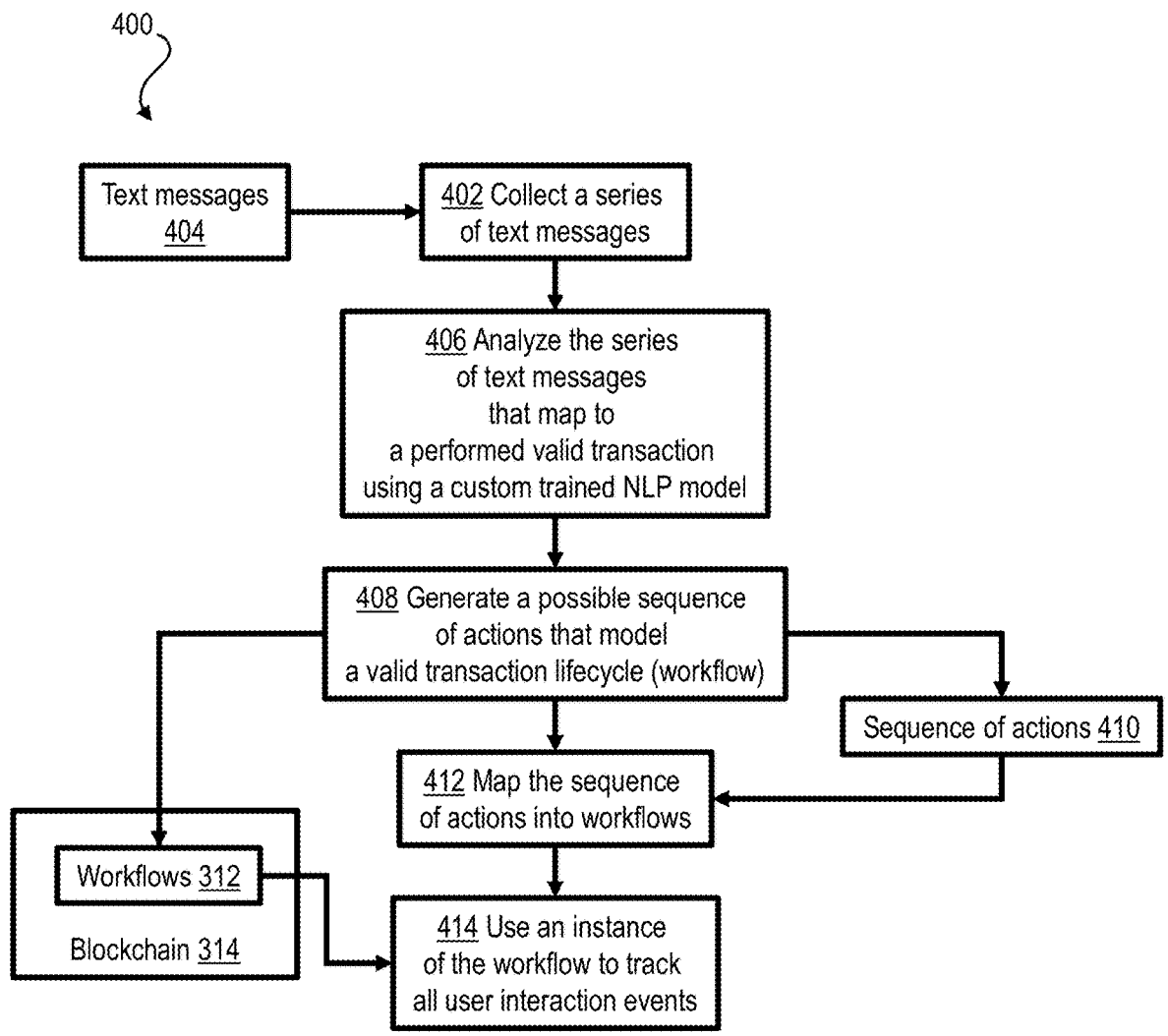
FIG. 4 depicts in a flowchart a method for identifying transaction lifecycle steps as performed by the system of FIG. 3, according to an exemplary embodiment.

FIG. 4 depicts a method 400 for identifying transaction lifecycle steps from a given SMS/USSD application, which is implemented by the workflow mapper 328 of the system 96. At 402, collect a series of text messages 404 that a user reviews in order to complete a workflow cycle. At 406, analyze the series of text messages, which map to a valid transaction that was performed, using a custom trained natural language processing (NLP) model.

An NLP model is a species of neural network. Generally, a neural network includes a plurality of computer processors that are configured to work together to implement one or more machine learning algorithms. The implementation may be synchronous or asynchronous. In a neural network, the processors simulate thousands or millions of neurons, which are connected by axons and synapses. Each connection is enforcing, inhibitory, or neutral in its effect on the activation state of connected neural units. Each individual neural unit has a summation function which combines the values of all its inputs together. In some implementations, there is a threshold function or limiting function on at least some connections and/or on at least some neural units, such that the signal must surpass the limit before propagating to other neurons. A neural network can implement supervised, unsupervised, or semi-supervised machine learning.

At 408, generate a possible sequence 410 of steps/actions that model a valid transaction lifecycle. At 412, map the sequence 410 of steps/actions into workflows 312 on the blockchain 314. At 414, use an instance of the generated workflow 312 to track all the user interaction events which are persisted on the blockchain. Tracking user interactions in non-internet applications (e.g. SMS, USSD) is an important step to ensure all steps/action related transaction events are captured in timely fashion. In addition, the generated workflow 312 facilitates to ensure that all the required steps/actions are followed sequentially by enforcing checks at each step/action. The collected events are further used to audit the transactions for any possible deviations within the expected steps/actions.

Figure 5:
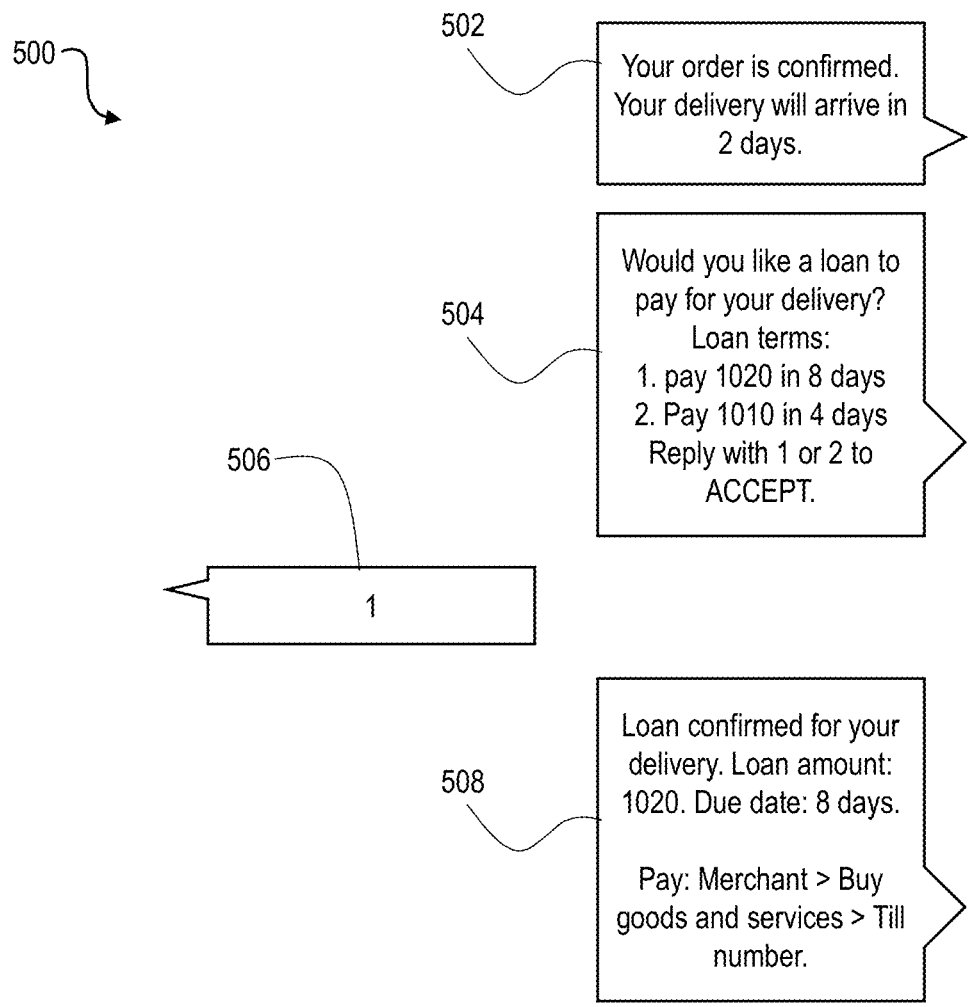
FIG. 5 depicts an exemplary communication sequence that is implemented by the system shown in FIG. 3.

FIG. 5 depicts an exemplary communication sequence 500 that is implemented by the system 96. At 502, a distributor's sales representative confirms an order of goods a trader or shopkeeper would like to buy and sends the trader a confirmation SMS. At 504, presuming the trader meets criteria to be offered financing for the order, the distributor sends loan offers via SMS. At 506, the distributor receives via SMS the trader's indication of the loan offer the trader would like to accept. At 508, financing of the order is confirmed and the trader receives an SMS with details on how to pay back the loan. Although SMS is described in the example, USSD also would be suitable for implementing this aspect of the invention. In some embodiments of the invention, the workflow mapper 328 conducts the messaging and persists the transaction lifecycle into a workflow 312 in the blockchain 314.

FIG. 6 depicts an exemplary data structure 600 for the system 96. The data structure 600 includes a first event doc0, a second event doc1, and a third event doc2. The first event doc0 was driven by a distributor sales representative to confirm an order made by a shopkeeper. The second event doc1 was driven by the shopkeeper, who answered a challenge question. The third event doc2 also was driven by the shopkeeper, who selected a loan amount for the confirmed order.

FIG. 7 depicts part of speech tagging 700 that is performed by the system 96, according to an exemplary embodiment. The part of speech tagging is implemented according to step 406 of method 400, using part-of-speech tagging NLP techniques, to identify different types of transaction steps (e.g., option selection, confirmation, etc.). Based on the speech tagging 700, the system 96 defines a challenge template 702 for each identified type of the workflow transaction step or reuses a previously defined template by performing transaction similarity analysis. The challenge template 702 includes a first potential answer 704 and a second potential answer 706, which can be set as blanks when generating a fill-in-the-blank challenge question. The system 96 stores the generated templates in the blockchain 314 along with an associated transaction workflow 312. The challenge templates are in the form of CAPTCHA-like candidate challenges: <question, answer> pairs 704, 706. CAPTCHA-like in this case refers to the challenge—response nature of CAPTCHA. Each challenge candidate constitutes a question with its complementary answer. The question is posed to the user as a challenge, the user is then required to respond with the appropriate answer.

Figure 8:
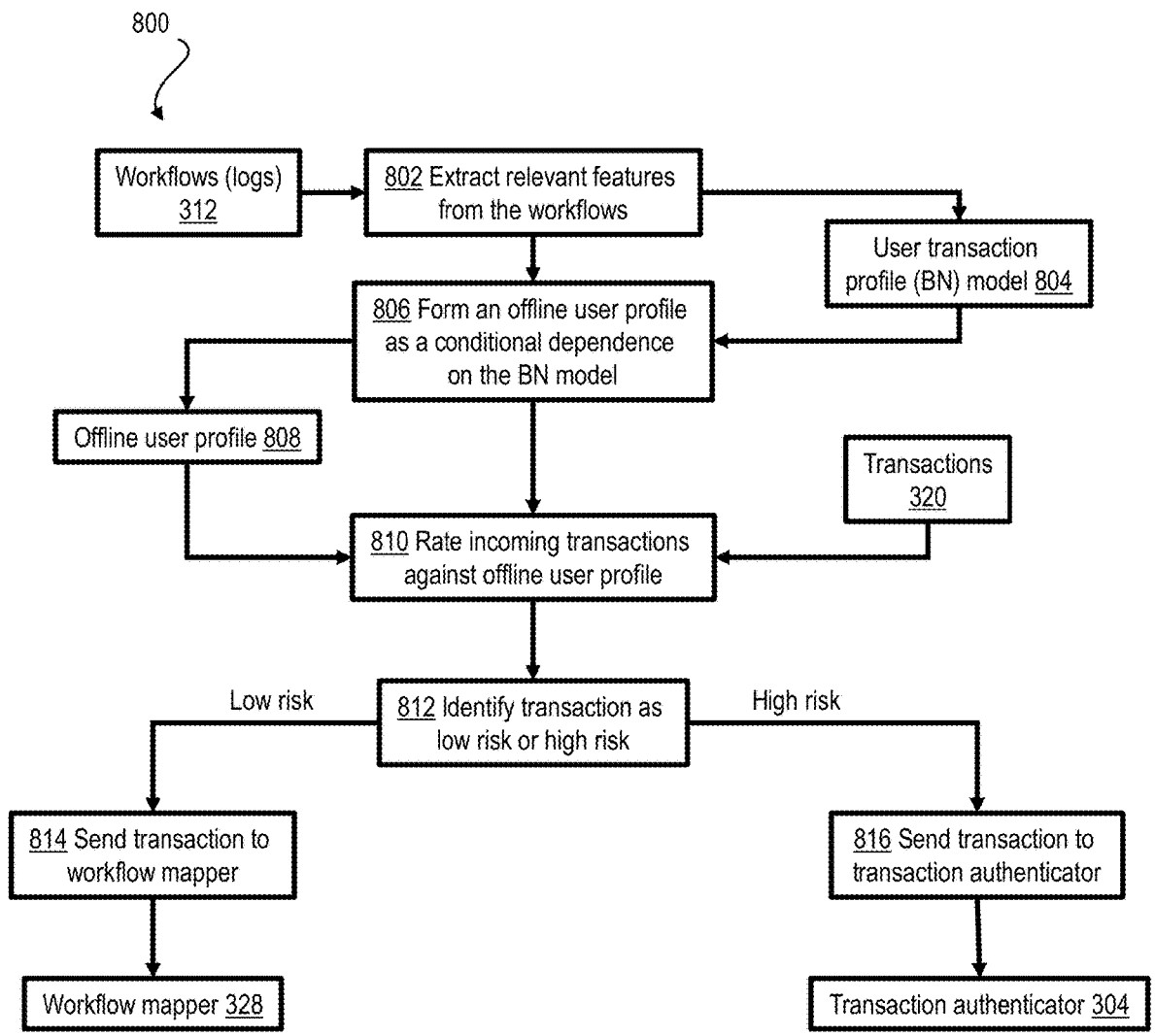
FIG. 8 depicts Bayesian transaction risk analysis performed by the system shown in FIG. 3, according to an exemplary embodiment.

FIG. 8 depicts Bayesian transaction risk analysis 800 that is performed by the risk analyzer 308 of the system 96, according to an exemplary embodiment. According to the risk analysis 800, each SMS/USSD transaction of a user is analyzed using a machine learning model (a Bayesian Network). The Bayesian Network is trained using historical transaction logs (the workflows 312), in which nodes represent features of transactions and directed edges represent conditional dependencies between the features of transactions. Operating characteristics of the risk analyzing BN 308 include:

At 802, a user transaction profile model 804 is formed by extracting relevant features from the logs 312: (a) total transaction time, (b) time taken between transaction steps, (c) errors committed when performing transaction actions.

At 806, an offline user profile 808 is used to validate every transactions and is formed as a conditional dependence on the Bayesian Network model 804. Conditional dependence is pertinent because some of the features of a transaction used to develop a user's transaction profile may have an influence towards other features of a transaction. The offline user profile is modeled using a combination of interaction events, basic user metadata (e.g., demographic data, business profile, etc.), and transaction features/characteristics (e.g., total transaction time, time taken between transactions, average value of transactions, etc.).

At 810, each incoming transaction 320 is rated against the user transaction profile model 804 to identify any anomalous behavior of the transaction. Some examples of anomalous behaviors include: unusually high number of action requests in a short period of time, unusually high number of multiple invalid action requests.

At 812 the risk analyzer 308 identifies the transaction 320 as a low risk transaction 324 or as a high risk transaction 326. If it is a low risk transaction 324 then at 814 the risk analyzer 308 sends it to the workflow mapper 328. If it is a high risk transaction 326 then at 816 the risk analyzer 308 sends it to the transaction authenticator 304.

Figure 9:
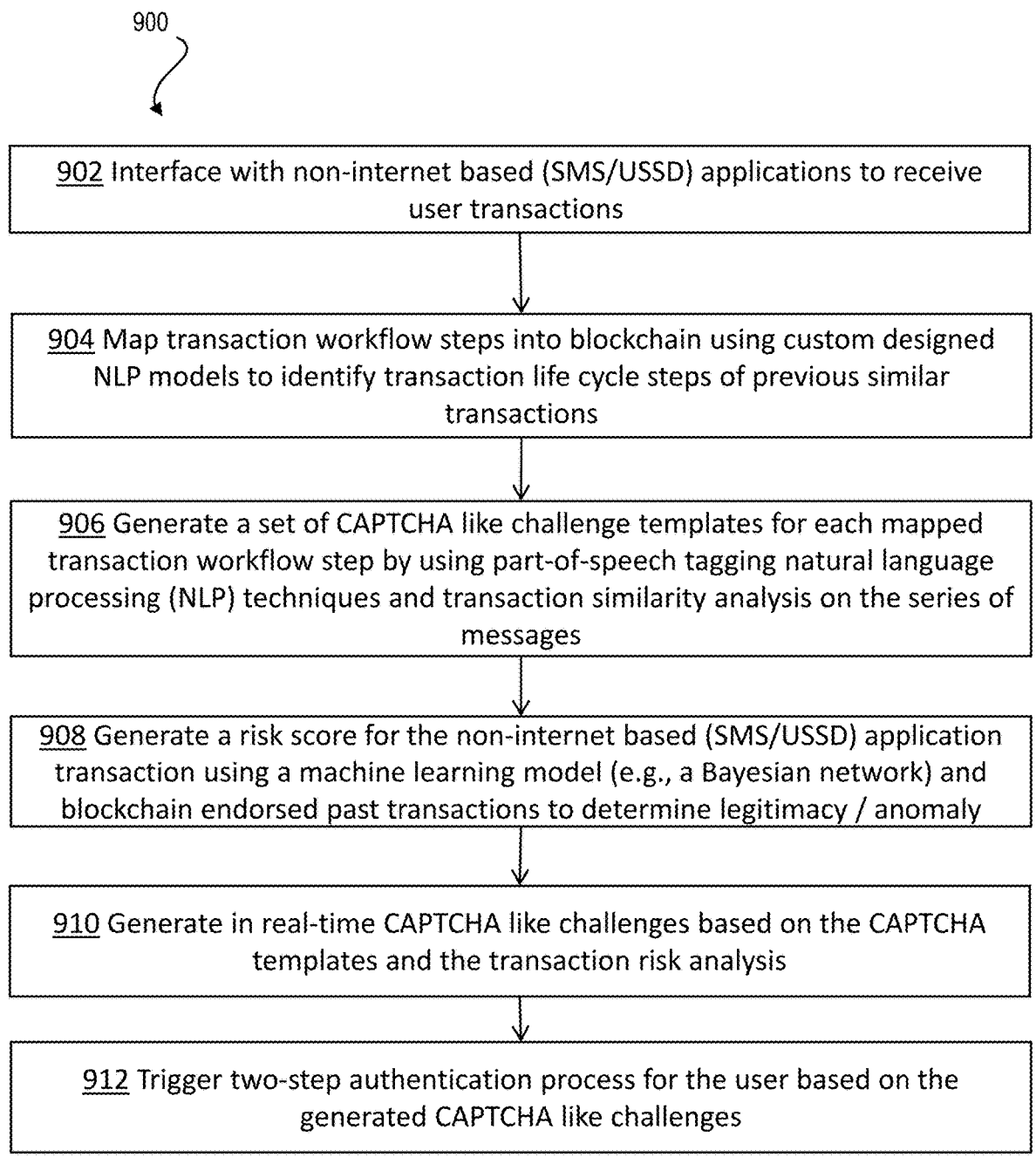
FIG. 9 depicts in a flowchart a method for multi-factor authentication that is performed by the system shown in FIG. 3, according to an exemplary embodiment.

FIG. 9 depicts in a flowchart a method 900 for multi-factor authentication that is performed by the system 96. The method 900 triggers multi-factor authentication using predefined rules based on the output of the risk analyzer 308, i.e. multi-factor authentication is triggered when the transaction is identified as a high risk transaction 326. For example: if(isRisk(tx)≥multiFactorThreshold) →mAuth=newMultiFactorAuth(numberOfQuestions) where multiFactorThreshold is a risk level threshold for the transaction tx, based on which the transaction authenticator requires a multi-factor authentication. The risk level threshold is determined at run-time based on the number of past successful transactions a user has performed. The fewer the number of past transactions a user has, the weaker their transaction profile model (higher risk assessed); therefore, a higher value of multiFactorThreshold will be set to reduce false positives when the user's transactions are being analyzed. The threshold value will be reduced as the user continues to perform more transactions in the system and their transaction profile model becomes better defined.

In the example rule above, the numberOfQuestions defines the number of challenge questions that should be generated once multi-factor authentication is triggered. To an extent, the numberOfQuestions depends on (a) the number of past transactions available (in the blockchain Hyperledger) to be used to generate the questions and on (b) the number of chances the user should get to validate the user's transaction.

At run-time, the set of challenge questions are dynamically added to the workflow of the specific transaction. A performed challenge generating transaction has the discriminated section of the SMS replaced with a blank for generating authentication challenge. The discriminated section of the SMS will be the answer/response to the authentication challenge that was generated. The discriminated section is hashed. This hashed answer together with the authentication challenge are stored in the blockchain system. When the fill-in-the-blank challenge is posed to the user, the user's response is hashed and compared to that stored in the database for validation. In case of failure, a new set of challenges are posed with updated risk level.

Thus, at 902 the system 96 interfaces with a non-internet (SMS/USSD) based (offline) application to receive user transactions. At 904, the system 96 maps transaction workflow steps into blockchain using custom NLP models to identify transaction life cycle steps of previous similar transactions. These are NLP models that are used to map the SMS/USSD messages generated during execution of a transaction into workflow steps based on the context of the transactions performed. At 906, the system 96 generates a set of CAPTCHA-like challenges. CAPTCHA-like in this case refers to the challenge—response nature of CAPTCHA. Each challenge candidate constitutes a question with its complementary answer. The question is posed to the user as a challenge, the user is then required to respond with the appropriate answer. Challenge templates for each mapped transaction workflow step are generated at 906 using sentence tagging NLP techniques. At 908, the system 96 performs transaction risk analysis for the offline application transaction using a Bayesian network machine learning model (risk analyzer 308) and blockchain endorsed past transactions (workflows 312). At 910, the system 96 generates, in real-time, CAPTCHA-like challenges based on the CAPTCHA templates and the transaction risk analysis. The challenge—response templates are in the form of plain text questions and answer pairs. A question can be sent to the user through SMS and the user would respond back through the same means. To authenticate the user, compare a hash of their response to the hash of the expected answer which is stored in the database. At 912, the system 96 triggers a two-step authentication process using the generated challenges.

Once authentication is successfully completed, the transaction can be authorized and completed in response.

Given the discussion thus far, it will be appreciated that, in general terms, an exemplary method, according to an aspect of the invention, includes at 902 receiving a transaction generated by a user of a non-internet application; at 904 identifying transaction life cycle steps of previous similar transactions; at 908 generating a transaction risk score for the transaction using machine learning models and a blockchain record of the previous similar transactions; and in response to the transaction risk score exceeding a threshold value, at 912 authenticating the transaction and the user using two-step authentication. The two-step authentication uses challenge/answer templates derived from the blockchain record of previous transactions.

In one or more embodiments, the non-internet based application is a simple message service (SMS) application. In one or more embodiments, the non-internet based application is a USSD application.

In one or more embodiments, identifying transaction life cycle steps includes at 406 analyzing a series of messages from a complete workflow cycle of the non-internet based application using a custom natural language processing (NLP) model.

In one or more embodiments, the method also includes at 906 generating transaction life cycle step challenge templates by using part-of-speech tagging natural language processing (NLP) techniques and transaction similarity analysis on the series of messages.

In one or more embodiments, the method also includes at 408 generating a possible sequence of steps that model a valid transaction lifecycle.

In one or more embodiments, generating the transaction risk score at 908 includes determine legitimacy or anomaly of the transaction using a Bayesian network.

Figure 10:
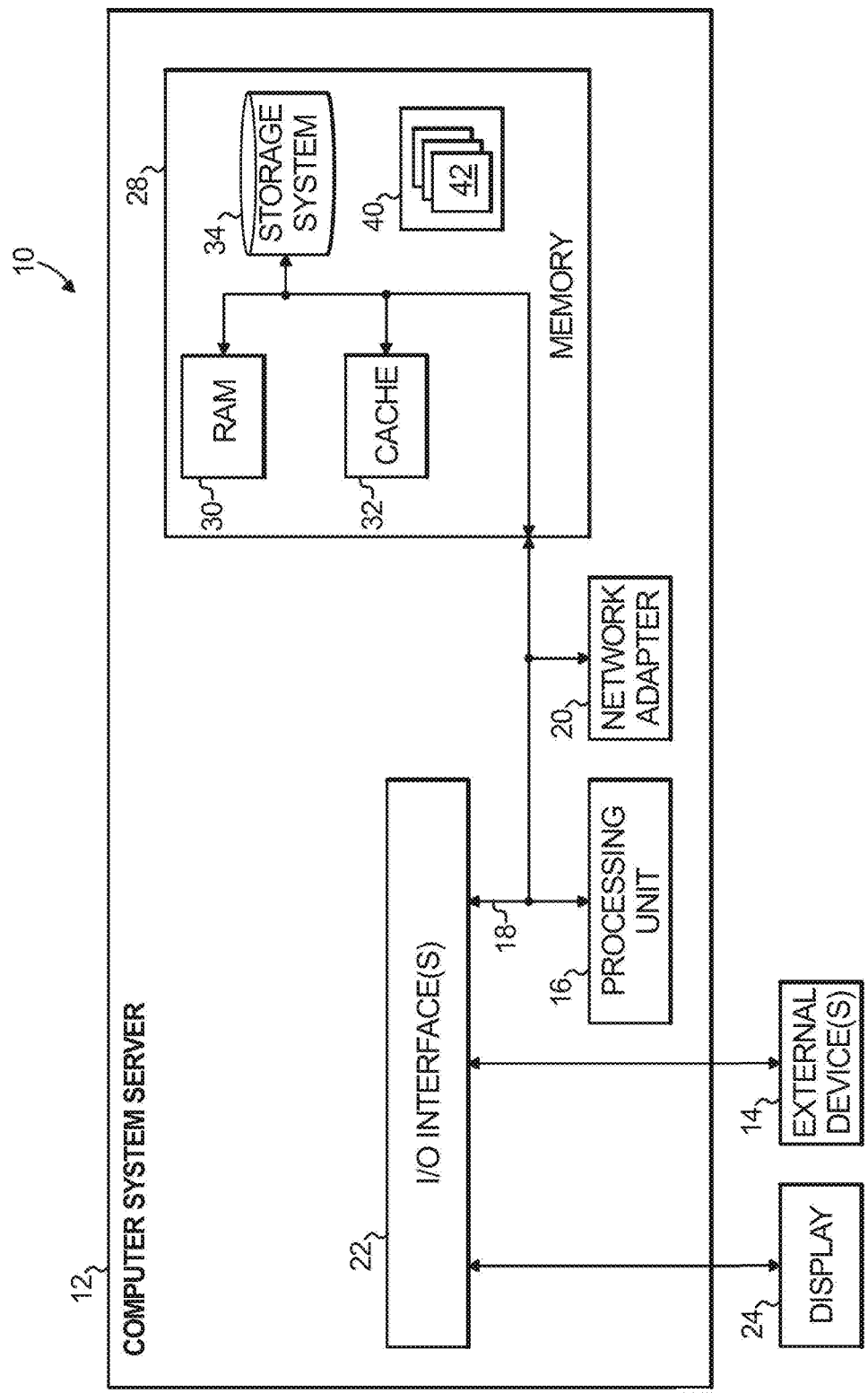
FIG. 10 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps, or in the form of a non-transitory computer readable medium embodying computer executable instructions which when executed by a computer cause the computer to perform exemplary method steps. FIG. 10 depicts a computer system that may be useful in implementing one or more aspects and/or elements of the invention, also representative of a cloud computing node according to an embodiment of the present invention. Referring now to FIG. 10, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 10, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 10) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described (e.g. in FIG. 3). The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving a transaction generated by a user of a non-internet application, wherein the non-internet based application is one of a simple message service (SMS) application and an unstructured supplementary service data (USSD) application;
   identifying transaction life cycle steps of previous similar transactions, wherein identifying transaction life cycle steps includes analyzing a series of messages from a complete workflow cycle of the non-internet based application using a custom natural language processing (NLP) model;
   generating a transaction risk score for the transaction using machine learning models and a blockchain record of the previous similar transactions;
   generating transaction life cycle step challenge templates by using part-of-speech tagging natural language processing (NLP) techniques and transaction similarity analysis on the series of messages; and
   in response to the transaction risk score exceeding a threshold value, authenticating the transaction and the user using two-step authentication,
   wherein the two-step authentication uses challenge/answer templates derived from the blockchain record of previous transactions.

2. The method of claim 1 further comprising generating a possible sequence of steps that model a valid transaction lifecycle.

3. The method of claim 1 wherein generating the transaction risk score includes determine legitimacy or anomaly of the transaction using a Bayesian network.

4. A non-transitory computer readable storage medium embodying computer executable instructions, which when executed by a computer cause the computer to facilitate a method of:
   receiving a transaction generated by a user of a non-internet application, wherein the non-internet based application is one of a simple message service (SMS) application and an unstructured supplementary service data (USSD) application;
   identifying transaction life cycle steps of previous similar transactions, wherein identifying transaction life cycle steps includes analyzing a series of messages from a complete workflow cycle of the non-internet based application using a custom natural language processing (NLP) model;
   generating a transaction risk score for the transaction using machine learning models and a blockchain record of the previous similar transactions;
   generating transaction life cycle step challenge templates by using part-of-speech tagging natural language processing (NLP) techniques and transaction similarity analysis on the series of messages; and
   in response to the transaction risk score exceeding a threshold value, authenticating the transaction and the user using two-step authentication,
   wherein the two-step authentication uses challenge/answer templates derived from the blockchain record of previous transactions.

5. The non-transitory computer readable storage medium of claim 4 further comprising generating a possible sequence of steps that model a valid transaction lifecycle.

6. The non-transitory computer readable storage medium of claim 4 wherein generating the transaction risk score includes determine legitimacy or anomaly of the transaction using a Bayesian network.

7. An apparatus comprising:
  a memory embodying computer executable instructions; and
  at least one processor, coupled to the memory, and operative by the computer executable instructions to facilitate a method of:
  receiving a transaction generated by a user of a non-internet application, wherein the non-internet based application is one of a simple message service (SMS) application and an unstructured supplementary service data (USSD) application;
  identifying transaction life cycle steps of previous similar transactions, wherein identifying transaction life cycle steps includes analyzing a series of messages from a complete workflow cycle of the non-internet based application using a custom natural language processing (NLP) model;
  generating a transaction risk score for the transaction using machine learning models and a blockchain record of the previous similar transactions;
  generating transaction life cycle step challenge templates by using part-of-speech tagging natural language processing (NLP) techniques and transaction similarity analysis on the series of messages; and
  in response to the transaction risk score exceeding a threshold value, authenticating the transaction and the user using two-step authentication,
  wherein the two-step authentication uses challenge/answer templates derived from the blockchain record of previous transactions.

8. The apparatus of claim 7 further comprising generating a possible sequence of steps that model a valid transaction lifecycle.

* * * * *